(12) United States Patent
Hall

(10) Patent No.: US 8,122,499 B2
(45) Date of Patent: Feb. 21, 2012

(54) NETWORK SECURITY APPARATUS AND METHOD

(75) Inventor: Aron Hall, Pittsburgh, PA (US)

(73) Assignee: Hobnob, Inc., Palo Alto, CA (US)

( * ) Notice: Subject to any disclaimer, the term of this patent is extended or adjusted under 35 U.S.C. 154(b) by 1025 days.

(21) Appl. No.: 10/824,273

(22) Filed: Apr. 14, 2004

(65) Prior Publication Data

US 2005/0022028 A1    Jan. 27, 2005

Related U.S. Application Data

(60) Provisional application No. 60/463,381, filed on Apr. 16, 2003.

(51) Int. Cl.
*G06F 11/30* (2006.01)

(52) U.S. Cl. .............. 726/22; 726/23; 726/24; 726/25; 709/223; 709/224; 709/225; 713/194; 705/50; 705/51; 705/52

(58) Field of Classification Search .............. 726/22–25; 713/187–188, 194; 709/222, 223–225, 228; 715/733; 707/E17.118; 382/101; 714/38; 705/53, 50–52

See application file for complete search history.

(56) References Cited

U.S. PATENT DOCUMENTS

| | | | | |
|---|---|---|---|---|
| 6,298,445 B1 * | 10/2001 | Shostack et al. | ............ | 726/25 |
| 6,952,779 B1 * | 10/2005 | Cohen et al. | ............ | 726/22 |
| 7,062,553 B2 * | 6/2006 | Liang | ............ | 709/224 |
| 7,234,168 B2 * | 6/2007 | Gupta et al. | ............ | 726/25 |
| 2003/0128229 A1 * | 7/2003 | Colson et al. | ............ | 345/733 |
| 2003/0159064 A1 * | 8/2003 | Takahashi | ............ | 713/200 |

* cited by examiner

*Primary Examiner* — Thanhnga Truong
(74) *Attorney, Agent, or Firm* — Van Pelt, Yi & James LLP

(57) ABSTRACT

A network security system and method performs quantifying and billing for network security consumed during a period of time. Implementations may include billing server configured to calculate the security protection consumed by calculating damages avoided from attacks that were blocked. The network security system also may include a scanner inside the customer network configured to scan devices for vulnerabilities and to quantify assets at risk. The system may further include an intrusion suppression module outside the customer network configured to maintain a list of attacks sustained and blocked during a period of time. The network security system may also include a blocker inside the customer network configured to detect unauthorized disclosures of confidential information and block the disclosures in real time.

28 Claims, 4 Drawing Sheets

NETWORK SECURITY APPARATUS AND METHOD

This application claims the priority benefit of U.S. Provisional Application No. 60/463,381, which was filed on Apr. 16, 2003, and is incorporated by reference in its entirety.

TECHNICAL FIELD

The present invention is related generally to network security software, hardware and services and more specifically to billing software for the purposes of charging for security consumption based on risk avoided and/or attacks thwarted.

BACKGROUND

Conventional billing software resides on a server computer system, called a server, and a client computer system called a client. Billing software in the server can determine if the client usage of the application is allowed and/or how much the user should be charged for that usage. Billing software in the client can provide usage information, such as the length of time the application was open, to the server for the purpose of billing.

This conventional approach works for software applications where usage is appropriately charged based on the length of time the application is used, such as a word processor or spreadsheet, or by the amount of data transferred, such as relational database searches or web-based searches.

The conventional approach, however, does not work for billing for security products and services because the benefit from security products is not a function of time or the amount of data transferred. The true value of a given security product is a function of the reduction in risk that the product delivers to the customer. Moreover, Internet attacks are uncertain and, therefore, the benefit from security products occurs unevenly with time.

Existing security solution providers sell their products based on a flat rate derived from total bandwidth or speed of the device, the number of hosts protected, the number of users and/or the number of connections that the device can support. This approach is similar to the approach taken by network infrastructure device manufacturers whose devices deliver value based on the size of network they can support. When applied to security products this approach creates perverse incentives: high-risk networks pay the same as low-risk networks. Highly efficient organizations are not rewarded for their effective practices and organizations with poor security practices don't have an incentive to improve. In addition, this flat-rate pricing keeps sophisticated protection out of the reach of small, budget constrained consumers which leaves their networks and devices vulnerable to compromise and may be used to attack others.

Accordingly, there is a need for a method and apparatus that can estimate the reduction in risk that a given security solution delivers to each customer thereby allowing the security provider to charge for their products based on the value they truly deliver to the consumer.

SUMMARY

In one general aspect, a network security apparatus includes a billing server configured to calculate security protection consumption during a period of time by quantifying damages avoided by one or more blocked attacks.

Implementations may include one or more of the following features. For example, calculating security protection consumption may include determining whether a blocked attack would have exploited a network vulnerability and determination if a blocked attack would have exploited network vulnerability may be determined by replaying the attack on the internal network.

In various embodiments, the apparatus may include a scanner configured to scan one or more devices for vulnerabilities. The scanner may be configured to quantify the risk of one or more devices and/or may be located within a customer network. The apparatus may include an intrusion suppression module configured to block attacks. The intrusion suppression module may be configured to maintain a list of attacks sustained and blocked during a period of time. The intrusion suppression module may be located outside a customer network.

In another general aspect, the network security method includes quantifying damages avoided by one or more blocked attacks and calculating security protection consumption during a period of time.

Implementations may include one or more of the following features. For example, the method may include determining whether a blocked attack would have exploited network vulnerability, scanning one or more devices for vulnerabilities, quantifying the risk of one or more devices, blocking one or more attacks, and/or maintaining of a list of attacks sustained and blocked during a period of time.

Aspects of the present invention may be implemented by a computer system and/or by a computer program stored on a computer readable medium. The computer readable medium may comprise a disk, a device, and/or a propagated signal. Other features and advantages will be apparent from the following description, including the drawings, and from the claims.

DETAILED DESCRIPTION

Figure 1:
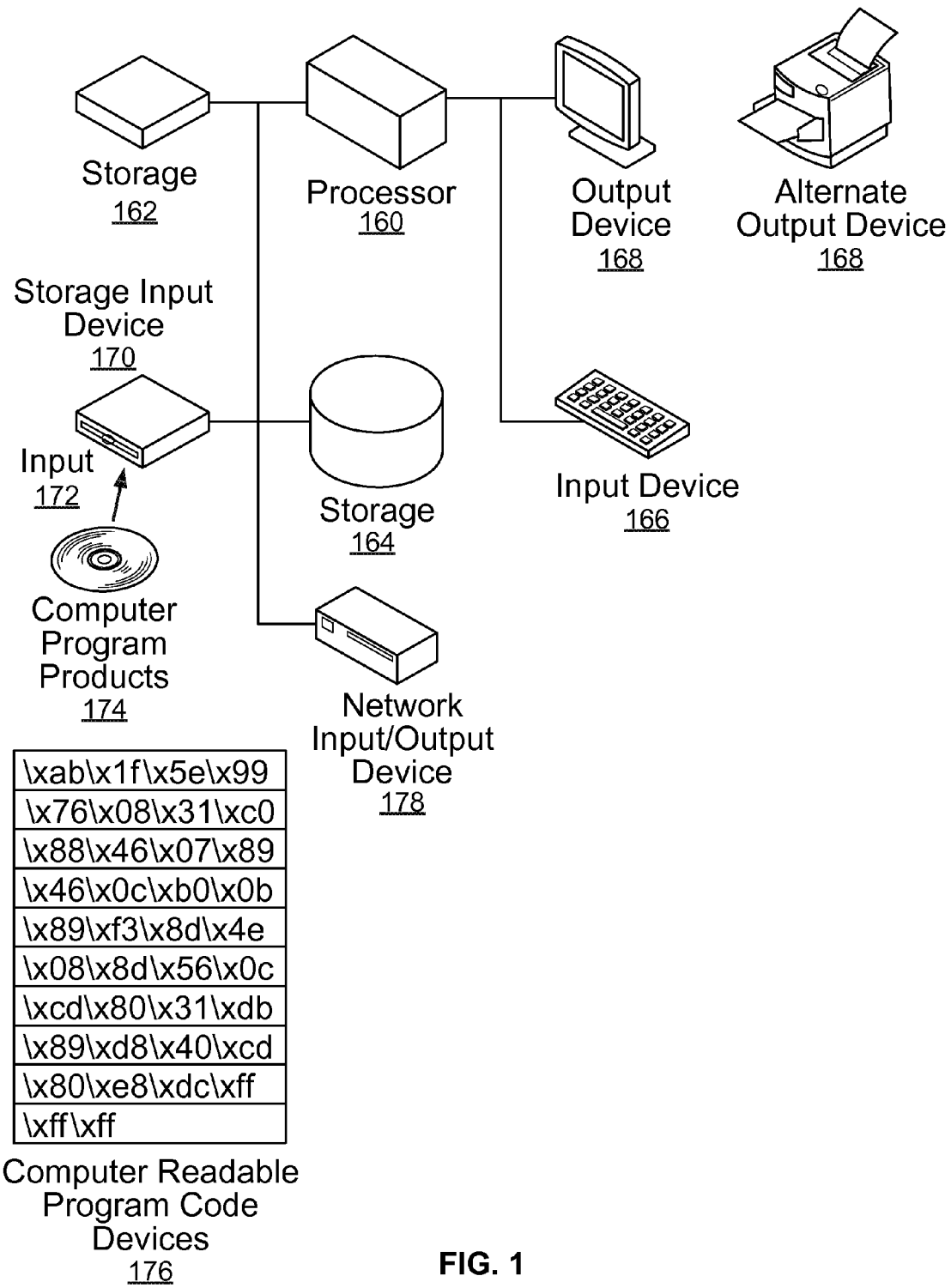
FIG. 1 illustrates a computer system implementing one embodiment of the present invention.

In one general aspect, a network security system and method performs quantifying and billing for network security consumed during a period of time. Implementations may include billing server configured to calculate the security protection consumed by calculating damages avoided from attacks that were blocked. The network security system also may include a scanner inside the customer network configured to scan devices for vulnerabilities and to quantify assets at risk. The system may further include an intrusion suppression module outside the customer network configured to maintain a list of attacks sustained and blocked during a period of time.

The network security system may also include a blocker inside the customer network configured to detect unauthorized disclosures of confidential information and block the disclosures in real time. The system may also include an acceptable network usage rule engine configured to preemptively block network ports when device vulnerabilities are discovered. The system may also include capability to induce the device owner to repair device vulnerabilities through a "social engineering" approach whereby blocked ports cause the device service to degrade gradually over time thus providing the incentive for the device owner to repair the vulnerability.

In general, the present invention improves the efficiency of the network security market by allowing products to be sold based on their value, allows much needed security technology to penetrate markets where customers do not have the budget to afford the protection they need, and makes the Internet safer for everyone.

It does not make economic sense for a business to spend more on network security systems to protect the business than its total expected annual loss in the event of an Internet worm and/or virus attack. Furthermore, a computer network that is maintained by a business with a highly efficient Information Technology (IT) staff that aggressively eliminates exploitable vulnerabilities on the network should pay less for a security solution than a network that is more vulnerable to attacks. In either case, the true value of a security solution in all of these cases is equivalent to the reduction in risk that the solution delivers.

In one aspect, the present invention maintains a database of known vulnerabilities, blocked attacks and other security incidents on a computer network that allows security providers to sell solutions based on their reduction in network security risk. Value is delivered, i.e., risk is reduced, when an attack is stopped that would have exploited a known vulnerability on the network at the time of the attack. The present invention thus may provide built-in facilities for protecting the network by blocking attacks and quarantining vulnerable hosts on the network. The present invention additionally may provide a rule engine for preemptively blocking ports or hosts based on the severity of the vulnerability. The rule engine can also be used to gradually degrade network access and thus induce the system owner to apply patches required to regain full network access.

In various embodiments, the present invention may solve one or more fundamental computer security market issues including, for example:

Rewarding customers who maintain low-risk computer networks and providing an incentive for customers that spread viruses, worms and other attacks to improve the security of their network;

Dramatically reducing the cost of providing open network access by inducing end-users to maintain secure endpoints or else incur degraded network access;

Providing Small and Medium-Sized Businesses (SMB), small colleges and universities, heath care providers, local schools and other budget constrained customers access to sophisticated network security equipment without cannibalizing sales to large enterprises; and Transforming the purchase of network security equipment from a primarily fear-based purchase to a purchase based on economic value.

FIG. 1 illustrates one embodiment of the present invention implemented as computer software on a computer system 150. As shown, the computer system 150 includes a processor 160 that retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions.

In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a floppy disk drive or CD-ROM drive accepts via input 172 computer program products 174 such as a floppy disk or CD-ROM or other nonvolatile storage media that may be used to transport computer instructions or data to the system 150.

In one implementation, computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below. The system 150 additionally has network input/output device 178 to allow the system to communicate with other computer systems and/or devices connected to the Internet and to allow the system to be remotely administered, for example, to update the computer readable program code devices residing on the system.

In one embodiment, each computer system 150 is a Super-Micro 6013P-8+2.6 GHz Dual-Processor Xeon computer with SysKonnect SK9822 Dual Port Gigabit Ethernet controllers commercially available from SuperMicro Corporation of 980 Rock Ave. San Jose, Calif. 95131 running the OpenBSD operating system, freely available from http://www.openbsd.org, although other systems may be used.

Figure 2:
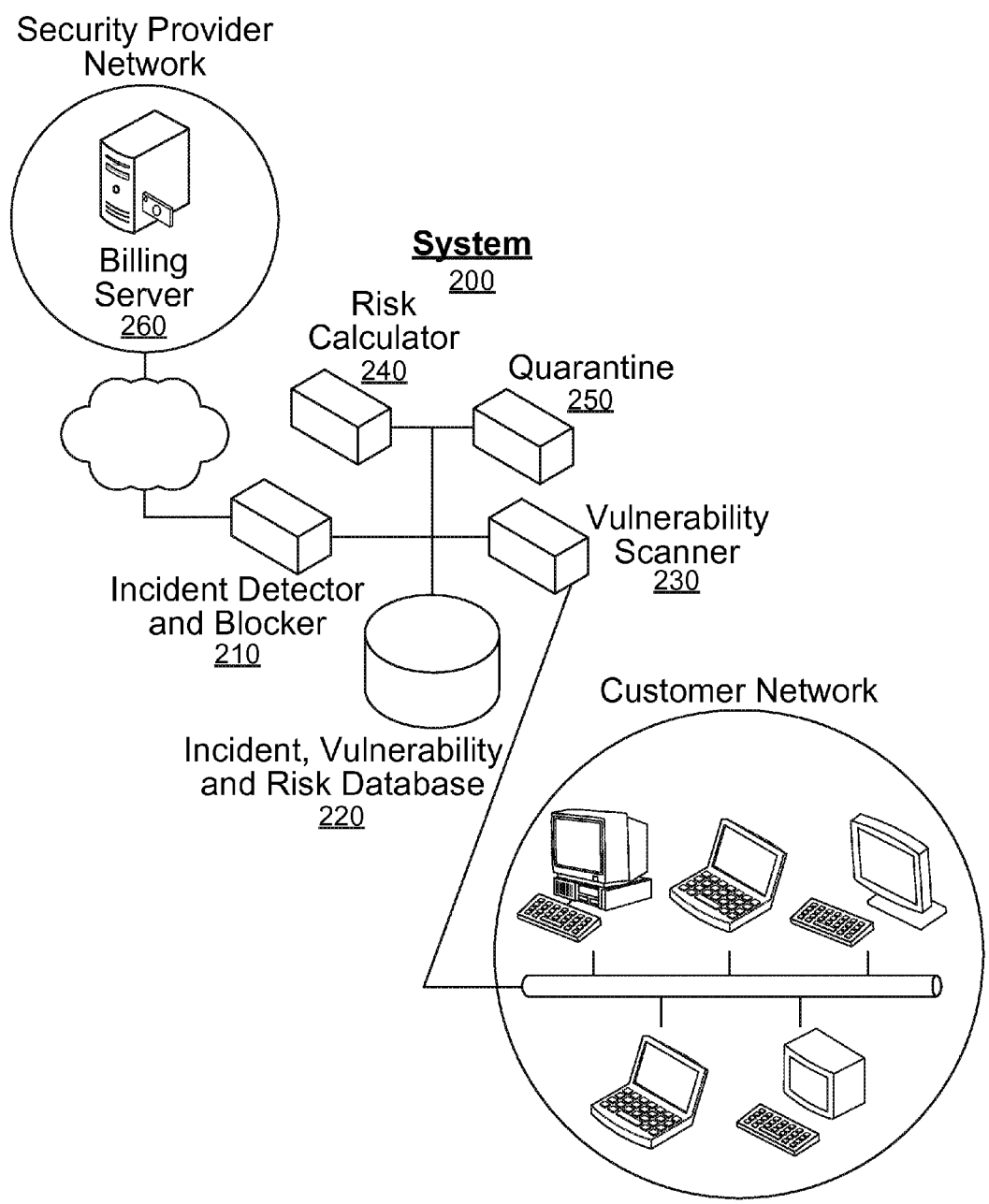
FIG. 2 illustrates a computer system for protecting a computer network according to one embodiment of the present invention.

Referring now to FIG. 2, a system 200 for protecting remote and third party networks and for billing based on security consumed and/or risk reduced is shown according to one embodiment of the present invention. In this embodiment, the entire system resides on a single computer. As used herein, a remote network is under the control of a business organization using system 200 and a third party network is under the control of the security provider for system 200 to the business organization. Both networks include computer systems and other network devices and equipment that may require protection from internal and external attacks. In one embodiment system 200 resides on a single computer for providing protection and security billing as described below. In another embodiment, some of the system 200 resides in multiple computer systems.

During configuration of system 200, the Vulnerability scanner 230 scans the entire customer network and enters each discovered vulnerability into the Incident, vulnerability and risk database 220. Also during configuration of system 200, the Quarantine 250 is setup to automatically block access to vulnerable systems discovered during the vulnerability scan depending on the severity, age or other essential aspect of the vulnerability. Furthermore, during configuration of the system 200 the Risk calculator 240 is configured with cost estimates for the known incident types.

Suppose, after configuration, a network attack originates on the Internet and targets the customer network in FIG. 2. The Incident detector and blocker 210, a freely available system such as Snort Inline (http://snort-inline.sourceforge.net) or a similar system configured to detect, block and log attacks, blocks the attack, records the incident in the Incident, vulnerability and risk database 220.

If, at the time of attack, a device on the customer network was vulnerable to the incoming attack and that vulnerability was recorded by Vulnerability scanner 230, a freely available network scanner such as Nessus (http://www.nessus.org) modified to write output to the Incident, vulnerability and risk database 220, then the Risk calculator 240 would enter a record into the Incident, vulnerability and risk database 220 to record that the attack was thwarted, network risk was reduced and protection was consumed. Periodically, or on demand, the risk information stored in the Incident, vulnerability and risk database 220 is uploaded to the Billing server 260 located on the Security provider network. If desired, the incident and vulnerability data can also be uploaded to the Billing server 260.

Quarantine 250 may block network access for a given host or device on the customer network if that host or device is determined to present an unacceptable risk to the customer network. If a host or device is quarantined, the device's network access will be limited to a secure subnet where the system can be safely repaired. In one embodiment, Quarantine 250 may degrade network access instead of blocking access entirely if the vulnerability is not critical but should be repaired. This gradual degradation is designed to compel end users to properly maintain their systems thereby reducing administration attack cleanup costs to the customer organization. This feature of the invention is particularly well suited to environments where the administrators do not directly control the endpoints such as the environment found at a college or university, hotspot or broadband service provider.

Figure 3:
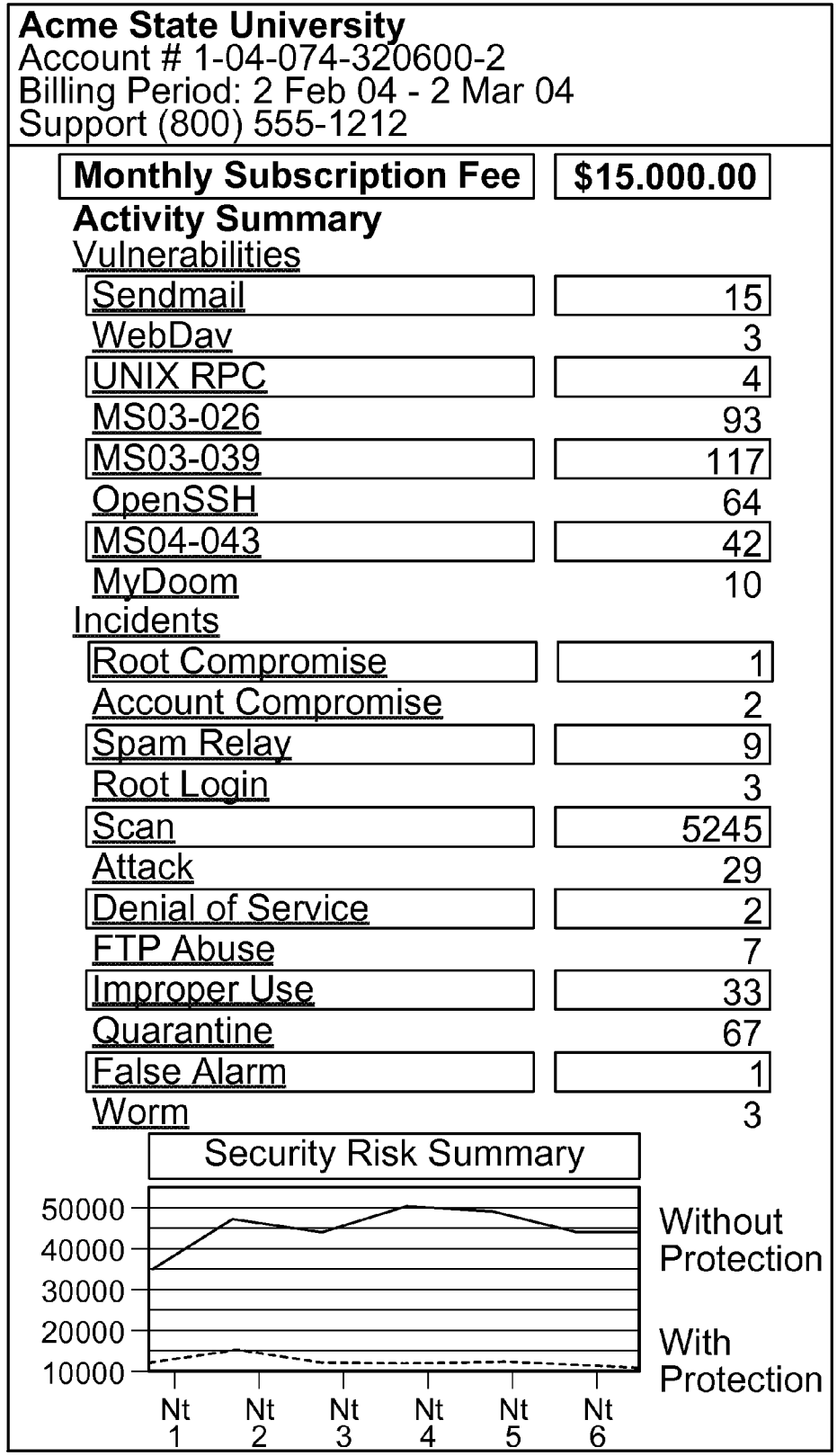
FIG. 3 is a diagram of a security bill for protection delivered to a customer according to one embodiment of the present invention.

Authorized customers from the Customer network shown in FIG. 2 can connect to the Billing server 260 and check their current charges along with a rollup of the security related incidents and vulnerabilities for their network during the billing period. One embodiment of the security bill produced by system 200 is shown in FIG. 3.

Figure 4:
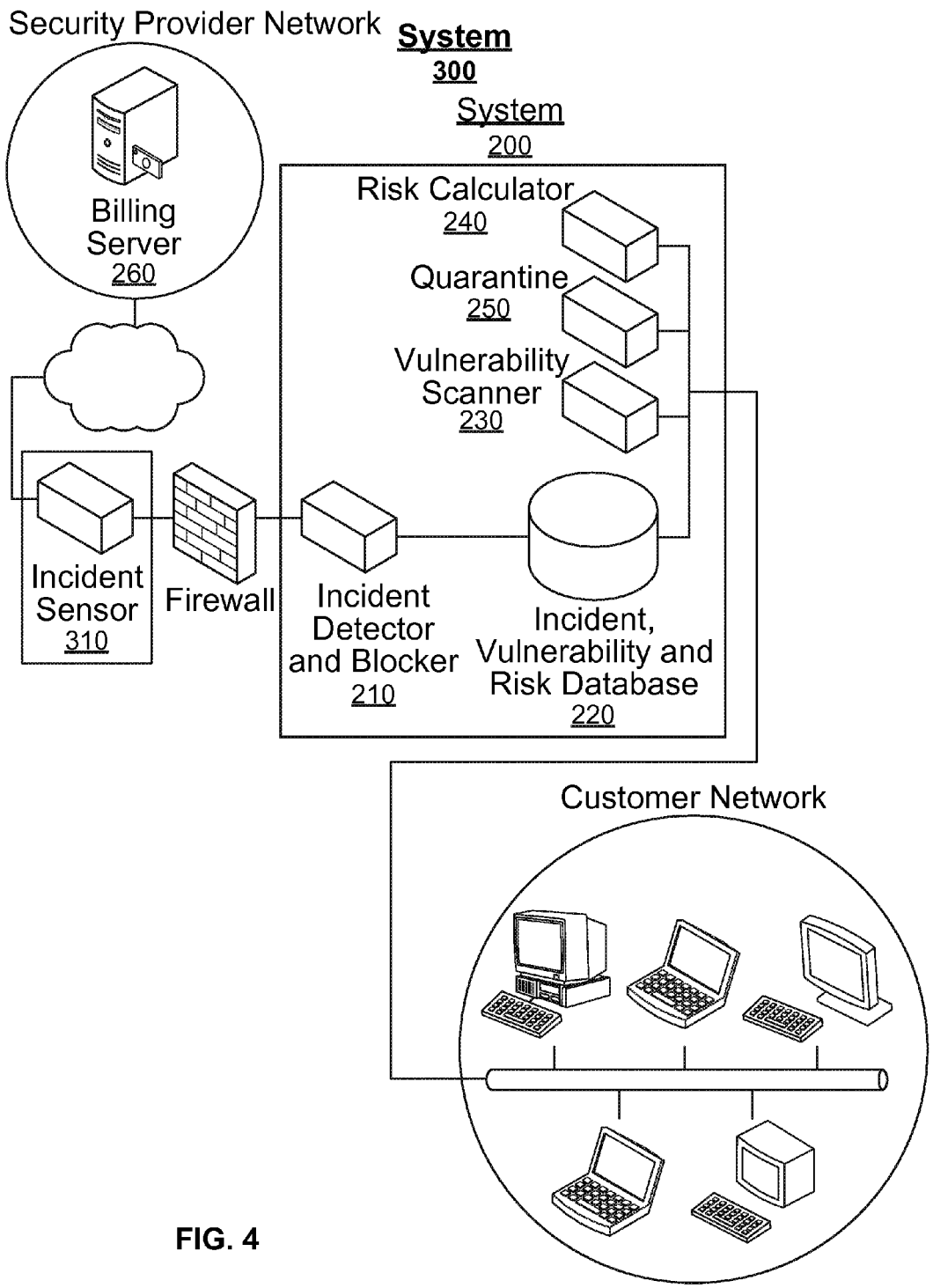
FIG. 4 illustrates another embodiment of the present invention.

FIG. 4 illustrates an alternate embodiment of the present invention where the invention resides in two computers for the purpose of calculating the risk reduction of an existing customer security device. In this embodiment, the existing customer security device may be a firewall. In another embodiment, the existing security device could be one or more other security countermeasures, such as an intrusion prevention system, for example.

In business organizations with existing security countermeasures installed system 300 is used to calculate the security value of the existing countermeasures. In this embodiment, system 200 is enhanced with Incident sensor 310 that is simply the Incident detector and blocker used in system 200 with the blocking disabled. Attacks originating on the Internet are first sensed and logged by the Incident sensor 310. The attack traffic is allowed to pass through the existing security countermeasures currently installed in the business organization.

In FIG. 4, the existing countermeasure is a single network firewall. If the attack is not stopped by the firewall, it will be detected, logged and blocked by the Incident detector and blocker 210. The difference between all attacks sensed on the network perimeter and attacks actually stopped by Incident detector and blocker 210 is the bypass rate of the existing security countermeasures. This data indicates the contribution to risk reduction of the existing security countermeasures. Incorporating acquisition and operating costs, the Risk calculator 240 can produce return on investment metrics that allow the customer to compare the economic value of the various security countermeasures currently installed on the business organization network.

A number of implementations have been described. Nevertheless, it will be understood that various modifications may be made and that other implementations are within the scope of the following claims.

What is claimed is:

1. A system comprising:
   a processor; and
   a memory, coupled to the processor, wherein the memory is configured to provide the processor with instructions which when executed cause the processor to:
   determine one or more quantities of damages avoided by one or more blocked attacks, wherein the processor is configured to determine the one or more quantities at least in part by determining a count of the one or more blocked attacks, and wherein a blocked attack comprises an attack that was thwarted at least in part by a deployed security protection;
   calculate security consumption during a period of time; and
   generate a security consumption report, wherein the security consumption report includes an indication of the one or more quantities of damages avoided by the one or more blocked attacks.

2. The system of claim 1, wherein determining one or more quantities of damages includes determining whether a blocked attack would have exploited a network vulnerability.

3. The system of claim 2, wherein determining whether a blocked attack would have exploited the network vulnerability includes replaying the attack on an internal network.

4. The system of claim 1, further comprising a scanner configured to scan one or more devices for vulnerabilities.

5. The system of claim 4, wherein the scanner is configured to quantify the risk of one or more devices.

6. The system of claim 4, wherein the scanner is located within a customer network.

7. The system of claim 1, further comprising an intrusion suppression module configured to block attacks.

8. The system of claim 7, wherein the intrusion suppression module is configured to maintain a list of attacks sustained and blocked during a period of time.

9. The system of claim 7, wherein the intrusion suppression module is located outside a customer network.

10. The system of claim 1, wherein the processor is configured to calculate security consumption including by determining an economic value associated with the damages avoided.

11. The system of claim 1, wherein the processor is configured to determine one or more quantities at least in part by determining a set of attacks sensed by existing security countermeasures of a customer.

12. The system of claim 11, wherein the processor is further configured to determine a difference between the sensed attacks and the blocked attacks.

13. A network security method comprising:
   determining, using a processor, one or more quantities of damages avoided by one or more blocked attacks, wherein the processor is configured to determine the one or more quantities at least in part by determining a count of the one or more blocked attacks, and wherein a blocked attack comprises an attack that was thwarted at least in part by a deployed security protection;
   calculating security protection consumption during a period of time; and
   generating a security consumption report, wherein the security consumption report includes an indication of the one or more quantities of damages avoided by the one or more blocked attacks.

14. The method of claim 13, further comprising determining whether a blocked attack would have exploited network vulnerability.

15. The method of claim 13, further comprising scanning one or more devices for vulnerabilities.

16. The method of claim 15, further comprising quantifying the risk of one or more devices.

17. The method of claim 13, further comprising blocking one or more attacks.

18. The method of claim 17, further comprising maintaining a list of attacks sustained and blocked during a period of time.

19. The method of claim 14, wherein determining whether a blocked attack would have exploited the network vulnerability includes replaying the attack on an internal network.

20. The method of claim 15, wherein scanning is performed by a scanner located within a customer network.

21. The method of claim 17, wherein blocking is performed by an intrusion suppression module that is located outside a customer network.

22. The method of claim 13, wherein the processor is configured to calculate security consumption including by determining an economic value associated with the damages avoided.

23. The method of claim 13, wherein the processor is configured to determine one or more quantities at least in part by determining a set of attacks sensed by existing security countermeasures of a customer.

24. The method of claim 23, wherein the processor is further configured to determine a difference between the sensed attacks and the blocked attacks.

25. A computer program product embodied in a non-transitory computer-readable storage medium, comprising computer executable instructions for:

determining one or more quantities of damages avoided by one or more blocked attacks, wherein the one or more quantities are determined at least in part by determining a count of the one or more blocked attacks, and wherein a blocked attack comprises an attack that was thwarted at least in part by a deployed security protection;

calculating security protection consumption during a period of time; and generating a security consumption report, wherein the security consumption report includes an indication of the one or more quantities of damages avoided by the one or more blocked attacks.

26. The computer program product of claim 25, further comprising computer instructions for determining whether a blocked attack would have exploited network vulnerability.

27. The computer program product of claim 25, further comprising computer instructions for scanning one or more devices for vulnerabilities.

28. The computer program product of claim 25, further comprising computer instructions for quantifying risk of one or more devices.

* * * * *